Dec. 22, 1964     J. N. SCOTT, JR., ET AL     3,162,707
BLOW MOLDING MEANS

Filed March 5, 1962                          4 Sheets-Sheet 1

INVENTORS
J.N. SCOTT, JR.
D.L. ALEXANDER
BY
ATTORNEYS

Dec. 22, 1964   J. N. SCOTT, JR., ETAL   3,162,707
BLOW MOLDING MEANS

Filed March 5, 1962

INVENTORS
J.N. SCOTT, JR.
D.L. ALEXANDER
BY
*Young & Quigg*
ATTORNEYS

United States Patent Office
3,162,707
Patented Dec. 22, 1964

3,162,707
BLOW MOLDING MEANS
John N. Scott, Jr., and Doyle L. Alexander, Bartlesville, Okla., assignors to Phillips Petroleum Company, a corporation of Delaware
Filed Mar. 5, 1962, Ser. No. 177,415
6 Claims. (Cl. 264—98)

This invention relates to forming molded articles. In one aspect the invention relates to means for forming plural item blow molded articles. In another aspect it relates to a method for forming tote boxes from a single parison.

The mechanical process known as blow molding by which hollow objects are produced by extruding a quantity of moldable material into a hollow mold and then inflating said material against the mold surface where it freezes into a shape stable at ambient temperatures is a highly useful one in the plastic molding industry. However, most of the prior art methods appear limited to means for repetitively producing one closed blow molded article, such as a bottle or similar type of container item from each parison.

More recently, interest has been high in the production by blow molding of open sided articles, such as equipment parts, toys, carrying case panels, and the like. The geometry of such articles usually makes extensive trimming with accompanying material waste, inevitable. Moreover, the lack of uniform wall thickness that often results is an additional disadvantage.

Accordingly, it is an object of this invention to provide means and a method to fabricate multiple items by blow molding with minimal trimming.

It is another object of this invention to fabricate a pair of open face blow molded items from a single parison.

It is a further object of this invention to fabricate tote boxes having plural compartments from a single parison.

Other objects, advantages, and alterations of this invention will become apparent to those skilled in the art without departing from the scope and spirit of this invention and it should be understood that the latter is not necessarily limited to the aforementioned discussion.

Broadly, our invention comprises providing apparatus, and a method of operating the same, for extruding a polymer melt from a die in the form of a parison, over an expandable frame while it is in the collapsed position, expanding the frame to its rectangular position and thus stretching and flattening the parison to form a continuous web of generally rectangular cross-section and of substantially uniform thickness, closing the mold halves over the stretched sheets, blowing air within the frame to expand the two sheets to fill and freeze into the opposing mold halves, which form, for example, two tote boxes simultaneously, the number of recesses in each box being determined by the configuration of the mold cavities.

The high mold clamping pressures available today with injection blow molding equipment, and the like, are adequate to completely cut the stretched parison along the "pinch out" edge that is provided on the periphery of the frame. Thus, as the mold halves close, the edges of the sheets formed by the stretched parison are trapped between the apex-like external edges of the expanded frame and the mold half edges, cutting a clean edge on the molded items.

A more complete understanding of the invention may be had by reference to the accompanying drawing, wherein like parts have been designated by the reference numerals, of which:

Figure 1:
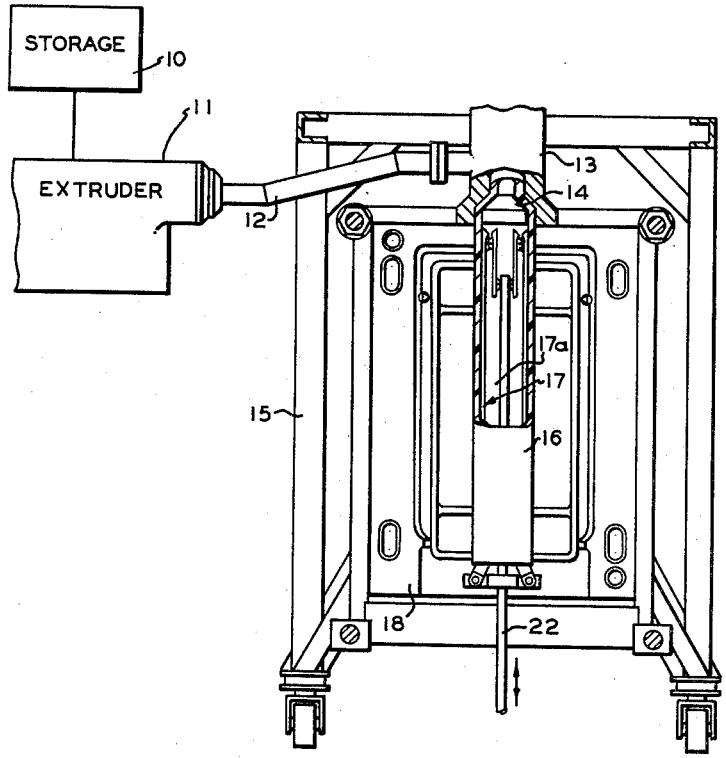
FIGURE 1 is an elevational view of the plural item blow molding apparatus of this invention, including expandable frame in the collapsed position and showing a partial section of a parison extruded thereover.

Referring now to FIGURE 1, plastic material is delivered from storage zone 10 to extruder 11 wherein it is reduced to a molten state. From extruder 11 the molten plastic is passed thru conduit 12 to die head 13 and about mandrel 14 all supported on a portable mold support, generally designated 15, to form a tubular parison 16. The parison is lowered until it completely extends over a frame 17, while the latter is in its collapsed position permitting the parison to easily fit thereover. One face 17a of frame 17 is disposed adjacent and spacedly from a stationary mold half 18. Opposite the other face 17b of frame 17 is an ejector mold half (shown in FIGURE 4a) which is adapted to reciprocate as directed in a horizontal plane so as to make periodic sealing engagement with the fixed mold half 18, thus enclosing frame 17.

Figure 2:
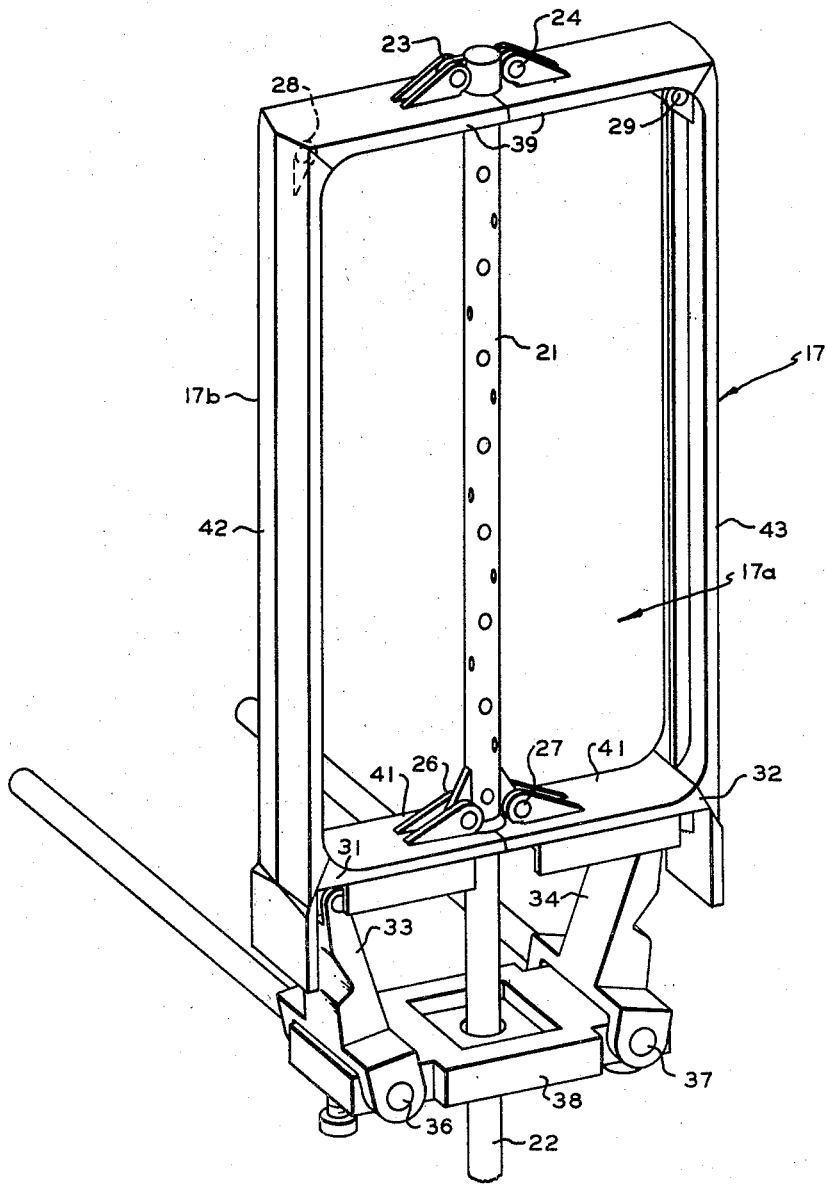
FIGURE 2 is an enlarged elevational view of the frame expanded.

In FIGURE 2, frame 17 is slidably secured to a perforated rigid tubing 21 positioned vertically between the mold halves. A pressure fluid, most conveniently air, is supplied to the interior of tubing 21 and thus to the interior of the parison 16 via conduit 22. The stretched parison 16, which is maintained in a softened condition, is thus blown outwardly to assume the shape of the cavity. The collapsible parison frame of this invention is shown in the expanded position. It will be noted that frame 17 is pivotally attached to rigid tubing 21 at both its upper and lower ends. Upper pivot hinges 23 and 24 are positioned external of the frame proper, and lower pivot hinges 26 and 27 are positioned within the frame. The upper corners of frame 17 are also pivotally connected by hinges 28 and 29. The lower corners 31 and 32 of the frame are pivotally connected to retracting arms 33 and 34, respectively. Arms 33 and 34 are pivotally connected at their lower ends 36 and 37 to support 38, which is secured to the lower end of tubing 21.

Figure 3:
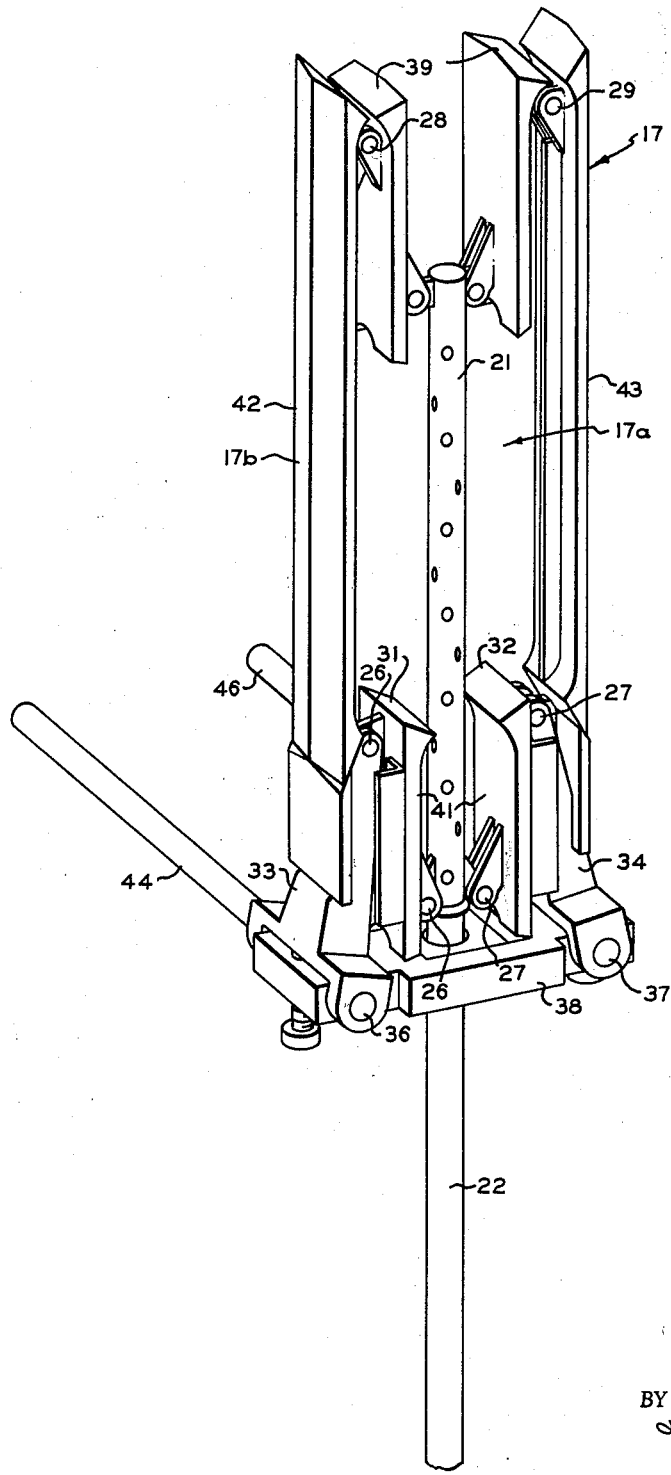
FIGURE 3 is an elevational view of the frame collapsed.

Thus, when tubing 21 is moved downward, either mechanically or pneumatically, the upper horizontal members 39 of frame 17 are drawn inwardly at its center, folding into parallel alignment. Similarly, the lower horizontal members 41 are drawn inwardly by arms 33 and 34, also folding into parallel alignment. Thus, vertical members 42 and 43 of frame 17 move inwardly toward tubing 21, maintaining their parallel, vertical alignment, due to the ganged downward travel of the folding horizontal members. Rods 44 and 46 connect frame support 38 to the entire assembly. The frame in the collapsed position is shown in FIGURE 3. It is in this latter position that the parison is extruded thereover.

Figures 4, 4A:
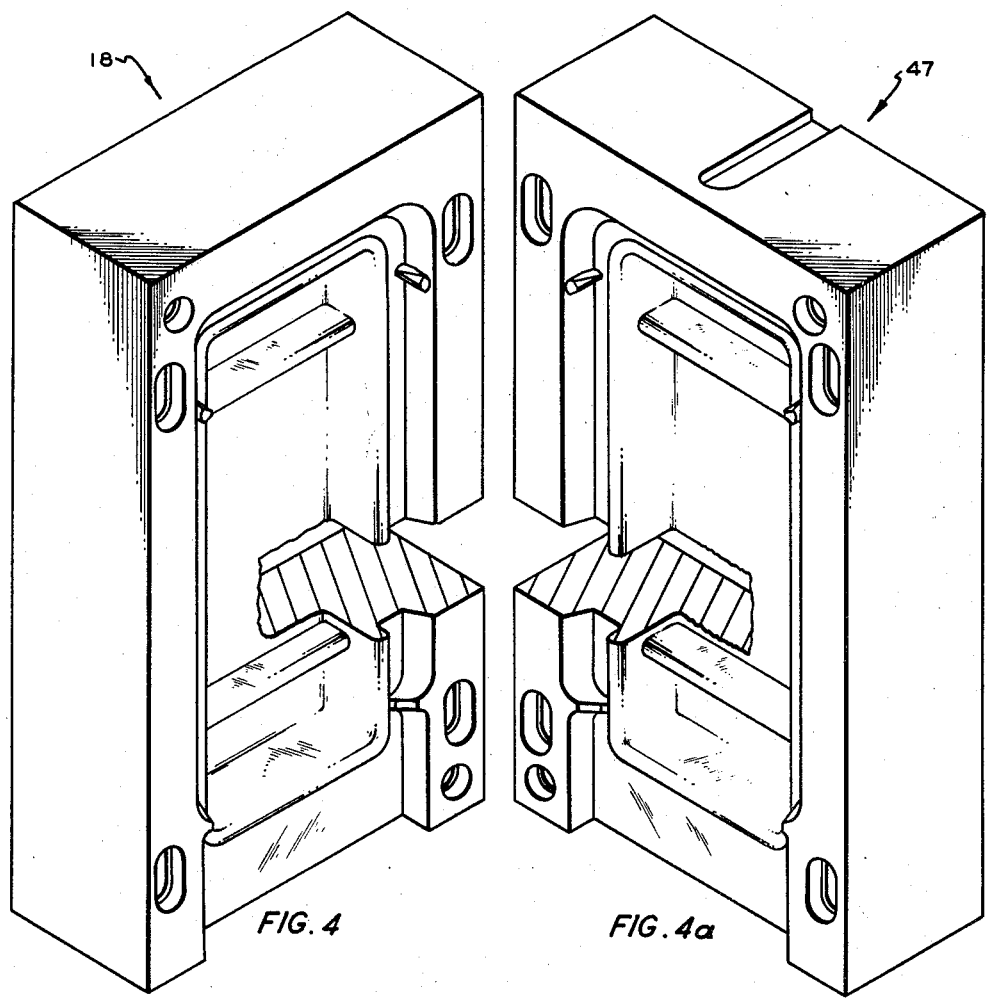
FIGURES 4 and 4a are a perspective view of a pair of removable mold halves adapted for use in this invention.

In FIGURE 4 is shown a perspective view of removable mold halves. In this instance, the mold halves 18 and 47 are mirror images, each defining the outer surface of an open faced, box-like article, typically called a tote box. The number of recesses in each mold half will of course determine the number of compartments of the resulting blown box.

Figure 5:
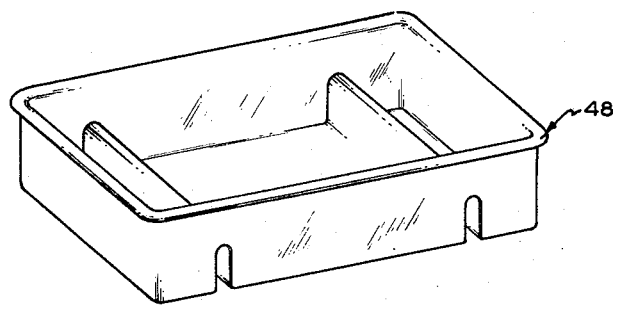
FIGURE 5 is a typical multi-compartment tote box formed according to this invention.

FIGURE 5 shows a typical molded article, specifically a tote box, 48, formed from the foregoing apparatus.

In operating, frame 17 is placed in the collapsed position by retracting tubing 21 to the lower limit of its preset travel. A plastic material is loaded into extruder 11. The molten material is extruded therefrom in the form of parison 16, which is lowered until it completely extends over frame 17, while the latter is in its collapsed position. The frame is expanded to its normally rectangular position by lifting tubing 21 to the upper limit of its preset travel. Simultaneously, the parison is stretched from a sleeve-like shape of relatively thick walls into a continuous web of generally rectangular cross-section and of substantially uniform thickness. The upper end of the parison is then severed.

Movable half 47 of the mold is moved laterally toward stationary half 18, and clamped shut. Air is then blown into the mold cavity via conduits 22 and perforate rigid tubing 21, expanding the opposing plastic sheets to fill and freeze into the opposing mold halves. After a sufficient time for cooling has elapsed, the mold is opened by retracting section 47 and the resulting pair of open faced articles are separated from their respective cavities.

Preferably the frame and mold halves are provided with compressing edges along their peripheries which give a clean edge to the formed articles separated from the mold.

The process of the present invention is applicable to substantially all of the thermoplastic normally solid polymers and resins, such as the polyolefins, and especially high density polyethylene, ranging between 0.960 and 0.980 for articles of good durability. In general, any solid polymer of an aliphatic mono-1-olefin can be used within the scope of this invention. Examples of such starting materials include polymers and copolymers of aliphatic mono-1-olefins, such as ethylene, propylene, butene-1, hexene-1, octene-1, and the like, and blends of these polymers and copolymers. Polymers of aliphatic mono-1-olefins having a maximum of 8 carbon atoms per molecule and no branching nearer the double bond than the fourth position provide thermoplastic containers having particularly desirable properties, such as thermal insulation, which increases the shrinkage rate of the blown inner wall. Homopolymers and copolymers, as well as mixtures of homopolymers and copolymers are suitable polymeric materials for the articles of the invention.

The polyolefins, especially polyethylenes, that can be employed in the practice of the present invention can be prepared by any of the methods which are usually employed for the preparation of these polymers. The high density polyolefins prepared by the low pressure processes now known are useful in the preparation of the container type articles of the invention. However, the invention is also applicable to the lower density polyolefins as well.

Reasonable variation and modification are possible within the scope of the foregoing disclosure, the drawing and the appended claims to the invention.

We claim:

1. Plural item molding apparatus comprising: parison extrusion means; a collapsible frame positioned so that a parison extruded from said extrusion means surrounds said frame when said frame is collapsed; a mold positioned on each side of said frame, means to expand said frame to deform the surrounding parison into a continuous web of general, rectangular cross-section, and means to force said sheets into the respective molds.

2. Plural item molding apparatus comprising: an accumulation chamber; molding material injection means for filling said accumulation chamber; parison extrusion means on the outlet of said accumulation chamber; a perforate rigid tubing disposed longitudinal of said extrusion means and adjacent thereto; a collapsible rectangular frame slidably mounted on said tubing; said tubing having a first position adapted to hold said frame collapsed while a parison is being extruded thereabout; a two-section mold with the mold halves disposed spacedly from the opposing faces of said frame while a parison is being extruded thereabout; said tubing having a second position adapted to hold said frame expanded, as desired; means to clamp said mold halves in sealing engagement after said parison has been stretched on said expanded frame; and means to pass a pressure fluid while said mold is in the closed position into the stretched parison and inflate the same against the mold surfaces until frozen therein.

3. The apparatus of claim 2 wherein said frame and said mold halves are provided with compressing edges along their peripheries to give a clean edge on the molded items.

4. The apparatus of claim 2 wherein each of said mold halves defines a cavity of at least two compartments.

5. The apparatus of claim 2 wherein said frame and said mold halves are provided with compressing edges along their peripheries to give a clean edge on the molded items, and each of said mold halves defines a cavity of at least two compartments.

6. A method for the simultaneous fabrication of two blow molded open faced articles from a single parison of molding material comprising: loading molten molding material into an accumulation zone; extruding said material therefrom in the form of a parison; stretching said parison into a continuous web of generally rectangular cross-section; severing the extruded portion of said parison; and forcing the faces of said web having the longer cross-sectional dimension to fill and freeze into opposing cavities of a mold half positioned on each side of said web and parallel to said faces.

References Cited in the file of this patent
UNITED STATES PATENTS

| 2,668,324 | Johnson | Feb. 9, 1954 |
| 3,009,196 | Hagen | Nov. 21, 1961 |

FOREIGN PATENTS

| 220,099 | Australia | Nov. 21, 1959 |

UNITED STATES PATENT OFFICE
CERTIFICATE OF CORRECTION

Patent No. 3,162,707　　　　　　　　　　　　December 22, 1964

John N. Scott, Jr., et al.

It is hereby certified that error appears in the above numbered patent requiring correction and that the said Letters Patent should read as corrected below.

Column 4, line 2, for "general," read -- generally --.

Signed and sealed this 4th day of May 1965.

(SEAL)
Attest:

ERNEST W. SWIDER　　　　　　　　　　　　EDWARD J. BRENNER
Attesting Officer　　　　　　　　　　　　Commissioner of Patents